United States Patent
Patil et al.

(10) Patent No.: US 10,740,021 B1
(45) Date of Patent: Aug. 11, 2020

(54) SYSTEMS AND METHODS FOR RECOVERY OF COMPUTING ENVIRONMENTS VIA A REPLICATION SOLUTION

(71) Applicant: Veritas Technologies LLC, Mountain View, CA (US)

(72) Inventors: Rushikesh Patil, Pune (IN); Sunil Hasbe, Shirur Anantpal (IN)

(73) Assignee: Veritas Technologies LLC, Santa Clara, CA (US)

( * ) Notice: Subject to any disclaimer, the term of this patent is extended or adjusted under 35 U.S.C. 154(b) by 194 days.

(21) Appl. No.: 15/939,628

(22) Filed: Mar. 29, 2018

(51) Int. Cl.
*G06F 11/00* (2006.01)
*G06F 3/06* (2006.01)
*G06F 11/14* (2006.01)
*H04L 29/06* (2006.01)
*G06F 9/4401* (2018.01)
*G06F 21/44* (2013.01)
*G06F 11/07* (2006.01)

(52) U.S. Cl.
CPC ............ *G06F 3/065* (2013.01); *G06F 3/0614* (2013.01); *G06F 9/4401* (2013.01); *G06F 11/0709* (2013.01); *G06F 11/0793* (2013.01); *G06F 11/1417* (2013.01); *G06F 11/1464* (2013.01); *G06F 21/44* (2013.01); *H04L 63/0428* (2013.01)

(58) Field of Classification Search
CPC ............. G06F 11/0709; G06F 11/0793; G06F 11/1448; G06F 11/1417; G06F 11/1458
See application file for complete search history.

(56) References Cited

U.S. PATENT DOCUMENTS

| | | | | |
|---|---|---|---|---|
| 8,869,138 | B2* | 10/2014 | Bandakka | G06F 11/1417 717/174 |
| 2007/0157016 | A1* | 7/2007 | Dayan | G06F 9/4416 713/2 |

(Continued)

OTHER PUBLICATIONS

Intel Corporation; Preboot Execution Environment (PXE) Specification Version 2.1; available at http://www.pix.net/software/pxeboot/archive/pxespec.pdf.

(Continued)

*Primary Examiner* — Charles Ehne
(74) *Attorney, Agent, or Firm* — FisherBroyles, LLP

(57) ABSTRACT

The disclosed computer-implemented method for recovery of computing environments via a replication solution may include (1) dynamically maintaining a replica of data associated with a protected computing device via a data replication device, (2) obtaining, from a preboot execution environment (PXE) server, a PXE that includes a bootable replication environment for the protected computing device, (3) directing the protected computing device to boot using the bootable replication environment, (4) exposing at least one data storage device associated with the protected computing device to the data replication device via a secure data connection, and (5) replicating the replica of data associated with the protected computing device to the data storage device associated with the protected computing device via the bootable replication environment and the secure data connection. Various other methods, systems, and computer-readable media are also disclosed.

20 Claims, 6 Drawing Sheets

(56) References Cited

U.S. PATENT DOCUMENTS

| | | | |
|---|---|---|---|
| 2011/0083004 A1* | 4/2011 | Lipinski | G06F 11/0727 713/2 |
| 2015/0074457 A1* | 3/2015 | Liu | G06F 11/0736 714/15 |

OTHER PUBLICATIONS

Veritas Technologies, LLC; Veritas Resiliency Platform 2.2 Solutions for Vmware; available at https://www.veritas.com/bin/support/docRepoServlet?bookId=125412413-125412416-1&requestType=pdf.

CENTOS Project; https://www.centos.org/; as accessed on Mar. 21, 2018.

Linux SCSI Target Framework (tgt) Project; http://stgt.sourceforge.net/; as accessed on Mar. 20, 2018.

LUN (Logical Unit Number); https://www.symantec.com/security_response/glossary/define.jsp?letter=l&word=lun-logical-unit-number; as accessed on Mar. 21, 2018.

Network Working Group; RFC3720—Internet Small Computer Systems Interface (iSCSI); available at https://tools.ietf.org/html/rfc3720; published Apr. 2004.

BIOS; https://en.wikipedia.org/wiki/BIOS; as accessed on Mar. 21, 2018.

Dynamic Host Configuration Protocol; https://en.wikipedia.org/wiki/Dynamic_Host_Configuration_Protocol; as accessed on Mar. 21, 2018.

GNU GRUB; https://en.wikipedia.org/wiki/GNU_GRUB; as accessed on Mar. 21, 2018.

httpd; https://en.wikipedia.org/wiki/Httpd; as accessed on Mar. 21, 2018.

iSCSI; https://en.wikipedia.org/wiki/ISCSI; as accessed on Mar. 19, 2018.

Preboot Execution Environment; https://en.wikipedia.org/wiki/Preboot_Execution_Environment; as accessed on Mar. 9, 2018.

* cited by examiner

SYSTEMS AND METHODS FOR RECOVERY OF COMPUTING ENVIRONMENTS VIA A REPLICATION SOLUTION

BACKGROUND

Organizations increasingly rely on physical and virtual machines to store and/or process digital assets. To protect against data loss and/or to minimize downtime, an organization may use a replication solution (e.g., a replication platform) to replicate digital assets to a local data store, a remote data store, and/or a cloud-based data store. In the event of data loss, such as a natural disaster, the replication solution may then recover the replicated assets, migrate the replicated assets to another machine or site, resynchronize the replicated assets back to a machine at the original site, and so forth.

However, recovery of some physical or virtual computing environments via conventional replication solutions may present various challenges. For example, recovery of a physical machine via a conventional replication solution may require various attach and/or detach operations with respect to one or more physical disks. Such attach and/or detach operations may be difficult to automate, and traditional automation solutions may depend on proprietary solutions that may not be cost effective or may involve a vendor lock-in. Likewise, recovery of a virtual machine via a conventional replication solution may present similar challenges, as performing attach and/or detach operations with respect to a virtual disk may require access to an underlying hypervisor of the virtual computing device. Such access may be difficult or impossible to obtain, particularly in the context of virtual machine instances that may be managed by third party providers.

Hence, the instant application identifies and addresses a need for additional systems and methods for recovery of computing environments via a replication solution.

SUMMARY

As will be described in greater detail below, the instant disclosure describes various systems and methods for recovery of computing environments via a replication solution by obtaining a preboot execution environment (PXE) that includes a bootable replication environment and directing a protected computing device to boot into the bootable replication environment. The systems and methods described herein may also expose, via the bootable replication environment, storage devices of the protected computing device to a data replication device via a secure data connection, and replicate (e.g., resynchronize) pre-replicated data associated with the protected computing device to the exposed storage devices via the bootable replication environment and the secure data connection.

In one example, a computer-implemented method for recovery of computing environments via a replication solution may include dynamically maintaining a replica of data associated with a protected computing device via a data replication device. The computer-implemented method may further include obtaining, from a PXE server, a PXE that may include a bootable replication environment for the protected computing device, and directing the protected computing device to boot using the bootable replication environment. In some examples, the computer-implemented method may further include exposing at least one data storage device associated with the protected computing device to the data replication device via a secure data connection, replicating the replica of data associated with the protected computing device to the data storage device associated with the protected computing device via the bootable replication environment and the secure data connection.

In some embodiments, the computer-implemented method may further include hosting, via the bootable replication environment, a hypertext transfer protocol (HTTP) server configured to receive representational state transfer (REST) directives, receiving, via the HTTP server, a REST directive that may include a secure reboot command, and directing, in response to receiving the secure reboot command via the HTTP server, the protected computing device to boot into a bootable operating environment of the protected computing device.

In some examples, the PXE may further include a set of configuration parameters associated with the data replication device, and exposing the data storage device associated with the protected computing device to the data replication device may include validating the set of configuration parameters.

In at least one embodiment, the bootable replication environment may include authentication information associated with the data replication device, and exposing the data storage device associated with the protected computing device to the data replication device may include establishing the secure data connection between the protected computing device and the data replication device the using the authentication information associated with the data replication device. In some examples, the authentication information may include at least one secure socket layer (SSL) public key associated with the data replication device.

In at least one example, the computer-implemented method may further include maintaining state information associated with at least one of (1) exposing the data storage device associated with the protected computing device to the data replication device, and (2) replicating the replica of data associated with the protected computing device. In some examples, the computer-implemented method may further include detecting an interruption in at least one of (1) exposing the data storage device associated with the protected computing device to the data replication device, and (2) replicating the replica of data associated with the protected computing device. In some embodiments, the computer-implemented method may further include resuming, based on the state information, at least one of (1) exposing the data storage device associated with the protected computing device to the data replication device, an (2) replicating the replica of data associated with the protected computing device based on the state information.

In some examples, the state information may include at least one of (1) a default state, (2) a not discovered state that corresponds to an initial state, (3) a validating state that indicates that the bootable replication environment is validating one or more configuration parameters, (4) an available state that indicates that the configuration parameters have been validated, (5) a ready to connect state that indicates that the data storage device associated with the protected computing device has been successfully exposed to the data replication device, (6) a connected state that indicates that the data replication device has successfully connected to the data storage device via the secured data connection, (7) a disconnected state that indicates that the data replication device has successfully disconnected from the protected computing device, and (8) an error state that indicates that an error has occurred.

In some embodiments, exposing the data storage device associated with the protected computing device to the data replication device may include exposing the data storage device associated with the protected computing device to the data replication device via an Internet Small Computer Systems Interface (iSCSI).

In at least one example, obtaining the PXE from the PXE server may include determining that the protected computing device is included in a list of pre-approved protected computing devices. In some examples, the data replication device hosts the PXE server.

In at least one embodiment, the protected computing device may include a physical computing device. In some embodiments, the protected computing device may include a virtual computing device.

In addition, a corresponding system for recovery of computing environments via a replication solution may include several modules stored in memory, including a maintaining module that dynamically maintains a replica of data associated with a protected computing device via a data replication device. The system may further include an obtaining module that obtains, from a PXE server, a PXE that may include a bootable replication environment for the protected computing device and a directing module that directs the protected computing device to boot using the bootable replication environment. The system may further include an exposing module that exposes at least one data storage device associated with the protected computing device to the data replication device via a secure data connection, and a replicating module that replicates the replica of data associated with the protected computing device to the data storage device associated with the protected computing device via the bootable replication environment and the secure data connection. The system may further include at least one physical processor that may execute the maintaining module, the obtaining module, the directing module, the exposing module, and the replicating module.

In some embodiments, the system may further include a hosting module that hosts, via the bootable replication environment, a HTTP server configured to receive REST directives, and receives, via the HTTP server, a REST directive that may include a secure reboot command. In some embodiments, the physical processor further executes the hosting module, and the directing module further directs, in response to the hosting module receiving the secure reboot command via the HTTP server, the protected computing device to boot into a bootable operating environment of the protected computing device.

In some examples, the PXE further may further include a set of configuration parameters associated with the data replication device, and the exposing module may expose the data storage device associated with the protected computing device to the data replication device by validating the set of configuration parameters.

In at least one embodiment, the bootable replication environment may include authentication information associated with the data replication device, and the exposing module may expose the data storage device associated with the protected computing device to the data replication device by establishing the secure data connection between the protected computing device and the data replication device the using the authentication information associated with the data replication device.

In at least one example, the system may further include a managing module that maintains state information associated with exposing the data storage device associated with the protected computing device to the data replication device and replicating the replica of data associated with the protected computing device. The managing module may further detect an interruption in at least one of (1) exposing the data storage device associated with the protected computing device to the data replication device, and (2) replicating the replica of data associated with the protected computing device. The managing module may further direct, based on the state information, at least one of (1) the exposing module to resume exposing the data storage device associated with the protected computing device to the data replication device, and (2) the replicating module to resume replicating the replica of data associated with the protected computing device based on the state information. In some examples, the physical processor may further execute the managing module.

In at least one example, the obtaining module may obtain the PXE from the PXE server by determining that the protected computing device is in a list of pre-approved protected computing devices.

In some embodiments, the protected computing device may include at least one of (1) a physical computing device, and (2) a virtual computing device.

In some examples, the above-described method may be encoded as computer-readable instructions on a computer-readable medium. For example, a computer-readable medium may include one or more computer-executable instructions that, when executed by at least one processor of a computing device, may cause the computing device to dynamically maintain a replica of data associated with a protected computing device via a data replication device. In some examples, the computer-readable medium may further include one or more computer-executable instructions that, when executed by the processor of the computing device, may cause the computing device to obtain, from a PXE server, a PXE that may include a bootable replication environment for the protected computing device, and direct the protected computing device to boot using the bootable replication environment. In some examples, the computer-readable medium may further include one or more computer-executable instructions that, when executed by the processor of the computing device, may cause the computing device to expose at least one data storage device associated with the protected computing device to the data replication device via a secure data connection, and replicate the replica of data associated with the protected computing device to the data storage device associated with the protected computing device via the bootable replication environment and the secure data connection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
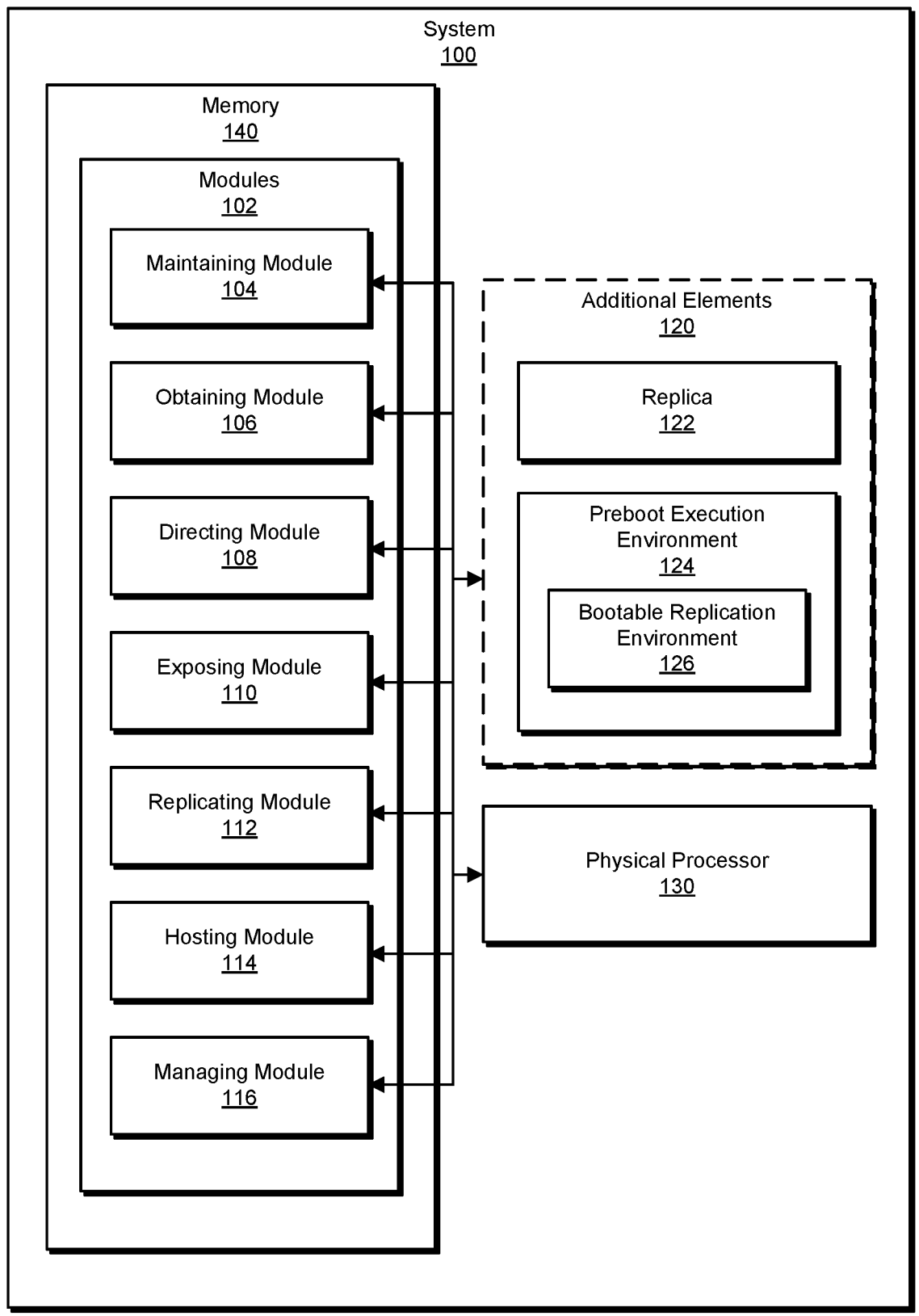
FIG. 1 is a block diagram of an example system for recovery of computing environments via a replication solution.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for recovery of computing environments via a replication solution. As will be explained in greater detail below, embodiments of the instant disclosure may dynamically maintain a replica (e.g., a backup, a clone, a reproduction, etc.) of data associated with a protected computing device (e.g., a personal computer, a server, a smart device, etc.) via a data replication device (e.g., a data mover, a backup device, etc.).

An embodiment may also obtain (e.g., via a trivial file transfer protocol (TFTP) and/or any other data transfer protocol), from a PXE server, a PXE that includes a bootable replication environment for the protected computing device. In some examples, the PXE may include a set of configuration parameters (e.g., an IP address of a data replication device, a designated dynamic host configuration protocol (DHCP) server, a set of protected replication disks, a set of sizes of a set of protected replication disks, a set of public keys, etc.). In additional examples, the bootable replication environment may include authentication information (e.g., a set of public cryptographic keys, a set of public secure sockets layer (SSL) keys, a set of public transport layer security (TLS) keys, etc.) associated with the data replication device. An embodiment may also direct the protected computing device to boot using the bootable replication environment.

An embodiment may also expose at least one data storage device (e.g., a physical disk, a virtual disk, a memory device, etc.) associated with the protected computing device to the data replication device via a secure data connection (e.g., an encrypted data connection, a SSL connection, a TLS connection, etc.). In some examples, exposing the data storage device to the data replication device may include exposing the data storage device associated with the protected computing device to the data replication device via an Internet Small Computer Systems Interface ("iSCSI"). An embodiment may then replicate the replica of data associated with the protected computing device to the data storage device associated with the protected computing device via the bootable replication environment and the secure data connection (e.g., a secure iSCSI connection).

By exposing a data storage device (e.g., a physical disk, a virtual disk, etc.) to a data replication device (e.g., a data mover, a backup device, etc.) via a secure data connection (e.g., a secure iSCSI connection) facilitated by a bootable replication environment, the systems and methods described herein may enable secure and automated replication of a replica (e.g., resynchronization) of data associated with the protected computing device directly to (e.g., at a block level) the exposed data storage device from the data replication device. Hence, the systems and methods described herein may enable automated re-replication (e.g., resynchronization) of replicated data with minimal (e.g., zero) administrator intervention. Additionally, the systems and methods described herein may be accomplished without physical access to a physical protected computing device, and/or without access to a hypervisor that creates and/or runs a virtual protected computing device.

The following will provide, with reference to FIGS. 1-2 and 4-6, detailed descriptions of systems for recovery of computing environments via a replication solution. Detailed descriptions of corresponding computer-implemented methods will also be provided in connection with FIG. 3.

FIG. 1 is a block diagram of an example system 100 for recovery of computing environments via a replication solution. As illustrated in this figure, example system 100 may include one or more modules 102 for performing one or more tasks. As will be explained in greater detail below, modules 102 may include a maintaining module 104 that dynamically maintains a replica of data associated with a protected computing device via a data replication device. Example system 100 may further include an obtaining module 106 that obtains, from a PXE server, a PXE that includes a bootable replication environment for the protected computing device, and a directing module 108 that directs the protected computing device to boot using the bootable replication environment. Example system 100 may further include an exposing module 110 that exposes at least one data storage device associated with the protected computing device to the data replication device via a secure data connection, and a replicating module 112 that replicates the replica of data associated with the protected computing device to the data storage device associated with the protected computing device via the bootable replication environment and the secure data connection.

As further illustrated in FIG. 1, in some embodiments, example system 100 may further include a hosting module 114 that hosts, via the bootable replication environment, a HTTP server configured to receive REST directives, and receives, via the HTTP server, a REST directive that may include a secure reboot command. In some examples, directing module 108 may further direct, in response to the hosting module receiving the secure reboot command via the HTTP server, the protected computing device to boot into a bootable operating environment of the protected computing device.

In further examples, as shown in FIG. 1, example system 100 may include a managing module 116 that maintains state information associated with exposing the data storage device associated with the protected computing device to the data replication device and replicating the replica of data associated with the protected computing device. Managing module 116 may also detect an interruption in at least one of (1) exposing the data storage device associated with the protected computing device to the data replication device and (2) replicating the replica of data associated with the protected computing device. Based on the state information, managing module 116 may direct at least one of (1) the exposing module to resume exposing the data storage device associated with the protected computing device to the data replication device and (2) the replicating module to resume replicating the replica of data associated with the protected computing device based on the state information.

As illustrated in FIG. 1, example system 100 may also include one or more additional elements 120, such as replica 122. Replica 122 generally represents a replica of data associated with a protected computing device. In some examples, replica 122 represents one or more data files that include a replica of data associated with a physical or virtual computing device that is protected by a data replication solution. Replica 122 may include a replica of data associated with any suitable physical computing device including, without limitation, a server, a desktop computer, a laptop computer, a smart phone, a hard drive, a memory device, and/or any other physical computing device. Additionally, replica 122 may include data associated with any suitable virtual computing device (e.g., a virtual machine, a virtual disk, etc.) created by and/or accessible through any suitable hypervisor technology. Example hypervisors may include, but are not limited to, VMWARE, WINDOWS HYPER-V, KERNEL-BASED VIRTUAL MACHINE (KVM), OPEN-STACK, VIRTUALBOX, and so forth. In some examples, replica 122 may include a replica of data associated with any suitable physical and/or virtual computing device, the replica maintained, created, accessed, stored, hosted, transmitted, and/or otherwise managed by VERITAS RESILIENCY PLATFORM data replication software and/or VERITAS NETBACKUP backup software.

As further shown in FIG. 1, additional elements 120 may further include a preboot execution environment 124 ("PXE 124"). In some examples, a "preboot execution environment" may include a client-server environment that boots a software assembly (e.g., an operating environment), retrieved from a PXE server via a network, on one or more PXE-enabled client devices. In some examples, PXE 124 may include a bootable replication environment 126 (also "BRE 126" herein). In some examples, a "bootable replication environment" may include any suitable bootable environment that may be utilized to boot a computing device and to replicate data maintained, created, accessed, stored, hosted, transmitted, and/or otherwise managed by another computing device to the computing device (e.g., from a data replication device such as a data mover to one or more protected computing devices).

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate recovery of computing environments via a replication solution. Examples of physical processor 130 may include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As further illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Figure 2:
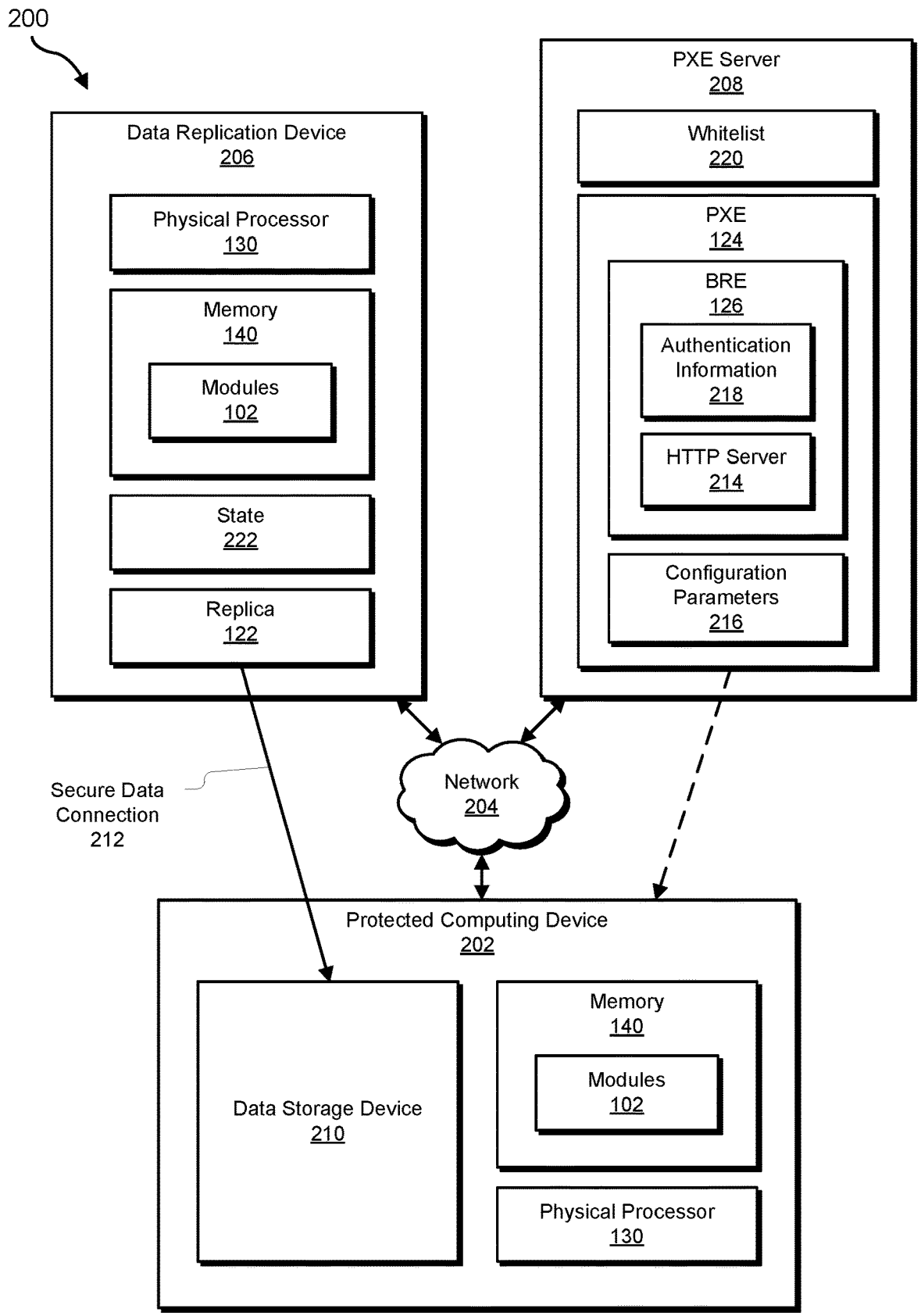
FIG. 2 is a block diagram of an example implementation of a system for recovery of computing environments via a replication solution.

Example system 100 in FIG. 1 may be implemented in a variety of ways. For example, all or a portion of example system 100 may represent portions of an example system 200 ("system 200") in FIG. 2. As shown in FIG. 2, system 200 may include protected computing device 202 in communication with data replication device 206 (also "DRD 206" herein) and PXE server 208 via network 204. In at least one example, protected computing device 202 may be programmed with one or more of modules 102. Additionally or alternatively, data replication device 206 and/or PXE server 208 may be programmed with one or more of modules 102.

In at least one embodiment, one or more modules 102 from FIG. 1 may, when executed by protected computing device 202, data replication device 206, and/or PXE server 208, enable protected computing device 202, data replication device 206, and/or PXE server 208 to perform one or more operations to recover computing environments via a replication solution. For example, as will be described in greater detail below, maintaining module 104 may cause protected computing device 202, data replication device 206, and/or PXE server 208 to dynamically maintain a replica of data (e.g., replica 122) associated with a protected computing device (e.g., protected computing device 202) via a data replication device (e.g., data replication device 206). Additionally, obtaining module 106 may cause protected computing device 202, data replication device 206, and/or PXE server 208 to obtain, from a PXE server (e.g., PXE server 208), a PXE (e.g., PXE 124) that may include a bootable replication environment (e.g., bootable replication environment 126) for the protected computing device (e.g., protected computing device 202). In some examples, directing module 108 may cause protected computing device 202, data replication device 206, and/or PXE server 208 to direct the protected computing device to boot using the bootable replication environment.

In some examples, exposing module 110 may cause protected computing device 202, data replication device 206, and/or PXE server 208 to expose at least one data storage device (e.g., data storage device 210) associated with the protected computing device (e.g., protected computing device 202) to the data replication device (e.g., data replication device 206) via a secure data connection (e.g., secure data connection 212). Additionally, in some examples, replicating module 112 may cause protected computing device 202, data replication device 206, and/or PXE server 208 to replicate the replica (e.g., replica 122) of data associated with the protected computing device to the data storage device associated with the protected computing device via the bootable replication environment (e.g., bootable replication environment 126) and the secure data connection.

In at least one embodiment, hosting module 114 may cause protected computing device 202, data replication device 206, and/or PXE server 208 to host, via the bootable replication environment (e.g., bootable replication environment 126), a HTTP server (e.g., HTTP server 214) configured to receive REST directives. Hosting module 114 may also cause protected computing device 202, data replication device 206, and/or PXE server 208 to receive, via the HTTP server, a REST directive that includes a secure reboot command. In such examples, directing module 108 may further cause protected computing device 202, data replication device 206, and/or PXE server 208 to direct, in response to protected computing device 202, data replication device 206, and/or PXE server 208 receiving the secure reboot command via the HTTP server, the protected computing device (e.g., protected computing device 202) to boot into a bootable operating environment of the protected computing device.

In some embodiments, the PXE (e.g., PXE 124) may include a set of configuration parameters (e.g., configuration parameters 216) associated with the data replication device (e.g., data replication device 206). In some examples, exposing module 110 may cause protected computing device 202, data replication device 206, and/or PXE server 208 to expose the data storage device (e.g., data storage device 210) associated with the protected computing device (e.g., protected computing device 202) to the data replication device by validating the set of configuration parameters.

In further examples, the bootable replication environment (e.g., bootable replication environment 126) may include authentication information (e.g., authentication information 218) associated with the data replication device (e.g., data replication device 206). In some examples, exposing module 110 may cause protected computing device 202, data replication device 206, and/or PXE server 208 to expose the data storage device (e.g., data storage device 210) associated with the protected computing device (e.g., protected computing device 202) to the data replication device by establishing the secure data connection (e.g., secure data connection 212) between the protected computing device and the data replication device the using the authentication information associated with the data replication device.

In at least one embodiment, managing module 116 may cause protected computing device 202, data replication device 206, and/or PXE server 208 to maintain state information (e.g., state 222) associated with exposing the data storage device (e.g., data storage device 210) associated with the protected computing device (e.g., protected computing device 202) to the data replication device (e.g., data replication device 206) and replicating the replica (e.g., replica 122) of data associated with the protected computing device. Managing module 116 may also cause protected computing device 202, data replication device 206, and/or PXE server 208 to detect an interruption in at least one of (1) exposing the data storage device associated with the protected computing device to the data replication device, and replicating the replica of data associated with the protected computing device. Managing module 116 may further cause protected computing device 202, data replication device 206, and/or PXE server 208 to direct, based on the state information (e.g., state 222), at least one of (1) the exposing module to resume exposing the data storage device associated with the protected computing device to the data replication device, and the replicating module to resume replicating the replica of data associated with the protected computing device based on the state information.

In at least one example, obtaining module 106 may cause protected computing device 202, data replication device 206, and/or PXE server 208 to obtain the PXE from the PXE server by determining that the protected computing device is in a list of pre-approved protected computing devices (e.g., whitelist 220).

Protected computing device 202 generally represents any type or form of computing device capable of reading and/or executing computer-executable instructions. In at least one embodiment, protected computing device 202 may accept one or more directions from data replication device 206 and/or PXE server 208. Examples of protected computing device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device. In some examples, protected computing device 202 may include a physical computing device and/or a virtual computing device.

Network 204 generally represents any medium or architecture capable of facilitating communication and/or data transfer between protected computing device 202, data replication device 206, and/or PXE server 208. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, APPLE LIGHTNING connections, and the like. Network 204 may facilitate communication or data transfer using wireless or wired connections. In one embodiment, network 204 may facilitate communication between protected computing device 202, data replication device 206, and PXE server 208.

Data replication device 206 generally represents any type or form of computing device capable of reading and/or executing computer-executable instructions and/or hosting executables. Examples of data replication device 206 include, without limitation, application servers, storage servers, database servers, web servers, and/or any other suitable computing device configured to run certain software applications and/or provide various application, storage, and/or database services. In at least one example, data replication device 206 may represent a data replication device (e.g., a data mover) configured to maintain, create, access, store, host, transmit, and/or otherwise manage replica 122.

Like data replication device 206, PXE server 208 generally represents any type or form of computing device capable of reading and/or executing computer-executable instructions. In at least one embodiment, PXE server 208 may accept one or more directions from protected computing device 202 and/or data replication device 206. Examples of PXE server 208 include, without limitation, application servers, storage servers, database servers, web servers, and/or any other suitable computing device configured to run certain software applications and/or provide various application, storage, and/or database services. In at least one embodiment, PXE server 208 may represent a server configured to provide a PXE (e.g., PXE 124) that includes a bootable replication environment (e.g., bootable replication environment 126) to protected computing device 202.

Although illustrated as separate devices in FIG. 2, in some examples, data replication device 206 may host (e.g., include computer-executable instructions capable of providing and/or configured to provide the functionality of) PXE server 208.

In at least one example, protected computing device 202, data replication device 206, and PXE server 208 may be computing devices programmed with one or more of modules 102. All or a portion of the functionality of modules 102 may be performed by protected computing device 202, data replication device 206, PXE server 208, and/or any other suitable computing system. As will be described in greater detail below, one or more of modules 102 from FIG. 1 may, when executed by at least one processor of protected computing device 202, data replication device 206, and/or PXE server 208, may enable protected computing device 202, data replication device 206, and/or PXE server 208 to recover computing environments via a replication solution.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
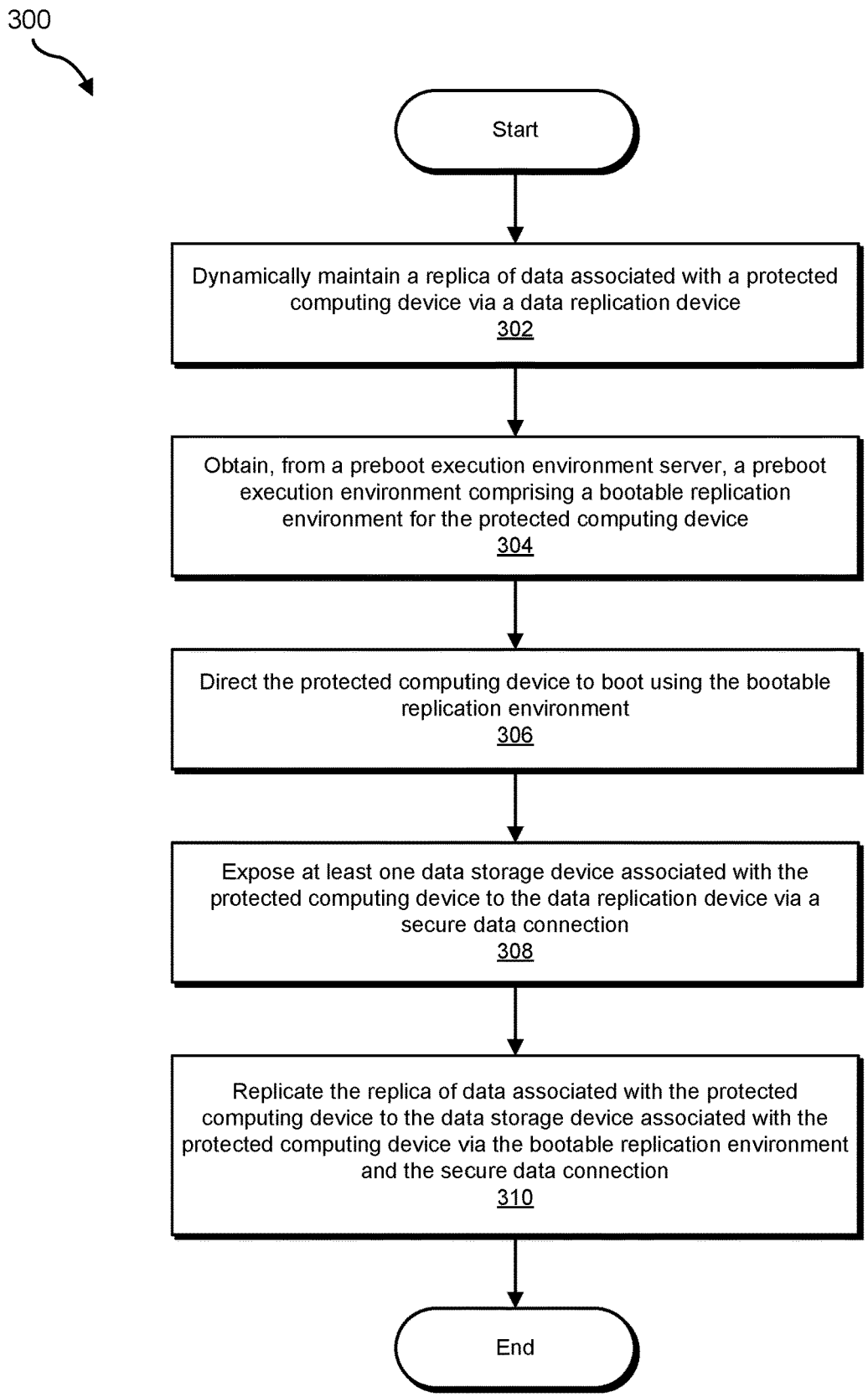
FIG. 3 is a flow diagram of an example method for recovery of computing environments via a replication solution.

FIG. 3 is a flow diagram of an example computer-implemented method 300 for recovery of computing environments via a replication solution. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may dynamically maintain a replica of data associated with a protected computing device via a data replication device. For example, maintaining module 104 may, as part of protected computing device 202, data replication device 206, and/or PXE server 208 in FIG. 2, cause protected computing device 202, data replication device 206, and/or PXE server 208 to dynamically maintain replica 122 of data associated with protected computing device 202 via data replication device 206.

As used herein, a "data replication device" may include any device configured to replicate data from a source storage location to a target storage location. In some examples, the source storage location may be at a first physical location and the target storage location may be at a second physical location. For example, data replication device 206 may include a data mover device ("data mover") that may be configured to replicate data associated with (e.g., stored, managed, and/or maintained by) a protected computing device (e.g., protected computing device 202) to a target storage location. In some examples, the target storage location may be associated with (e.g., part of, accessible to, managed by, etc.) data replication device 206. In additional or alternative examples, the target storage location may be a cloud-based storage location, such as may be provided by a cloud-based storage provider. Some suitable cloud-based storage providers may include, without limitation, AMAZON WEB SERVICES ("AWS"), MICROSOFT AZURE STORAGE, GOOGLE CLOUD STORAGE, and so forth.

As mentioned above, in at least some examples, data replication device 206 may include a data mover configured to replicate data associated with a protected computing device to a target storage location. In at least one embodiment, data replication device 206 may be located at a common physical location (e.g., on the same premises, at the same worksite, within the same building, within the same logical subdivision of a network, within the same political subdivision, etc.) as a protected computing device (e.g., protected computing device 202). In some examples, data replication device 206 may be configured to replicate data associated with protected computing device 202 to a target storage location that is also located at the common physical location, or to any suitable cloud-based storage location. In at least one example, data replication device 206 may store replica 122 of data associated with protected computing device 202.

In additional or alternative examples, data replication device 206 may be configured to replicate data associated with protected computing device 202 to a target storage location via an additional data mover device. For example, data replication device 206 may include a data mover located at a common physical location as protected computing device 202. An additional data mover may be located at a different physical location. The data mover included in data replication device 206 may utilize the additional data mover to replicate data associated with protected computing device 202 to the target storage location. In some examples, the target storage location may include a storage device located at the different physical location. In additional or alternative examples, the target storage location may be any suitable cloud-based storage location, as described herein. Hence, in some embodiments, data replication device 206 may include a data mover, and the data mover may utilize an additional data mover located at a different physical location to replicate data associated with protected computing device 202 to a target storage location.

Maintaining module 104 may dynamically maintain a replica of data associated with a protected computing device via a data replication device in a variety of contexts. For example, data replication device 206 may be included as part of a replication solution that also includes an input/output ("I/O") filter driver ("filter driver") that may be installed on and/or configured to monitor (e.g., read, intercept, interpret, tap, etc.) application I/O operations associated with protected computing device 202. Maintaining module 104 may cause the filter driver to send monitored application I/O data associated with protected computing device 202 to a target data mover, such as a target data mover included in data replication device 206. The target data mover may receive the application I/O data, and may then replicate the received application I/O data to a target storage location in any of the ways described herein. Hence, as described above, replica 122 may represent a replica of data associated with protected computing device 202. In this and other ways, maintaining module 104 may dynamically maintain a replica (e.g., replica 122) of data associated with a protected computing device (e.g., protected computing device 202) via a data replication device (e.g., data replication device 206).

Returning to FIG. 3, at step 304, one or more of the systems described herein may obtain, from a PXE server, a PXE that may include a bootable replication environment for the protected computing device. For example, obtaining module 106 may, as part of protected computing device 202, data replication device 206, and/or PXE server 208 in FIG. 2, cause protected computing device 202, data replication device 206, and/or PXE server 208 to obtain, from PXE server 208, PXE 124 that may include bootable replication environment 126 for protected computing device 202.

Obtaining module 106 may obtain, from PXE server 208, PXE 124 that may include bootable replication environment 126 for protected computing device 202 in a variety of contexts. For example, an administrator may power on protected computing device 202 and direct protected computing device 202 (e.g., via a basic input/output system (BIOS) of protected computing device 202) to boot using a PXE. protected computing device 202 may then broadcast a request to a network (e.g., network 204) such as a DHCP DHCPDISCOVER packet that includes an identifier associated with protected computing device 202 (e.g., a media access control (MAC) address of protected computing device 202) and/or a request for a PXE (e.g., PXE 124) from a PXE server (e.g., PXE server 208).

In some examples, obtaining module 106 may cause a network device (e.g., a DHCP server included as part of data replication device 206 and/or PXE server 208) to receive the request, and may direct the network device to respond with a message (e.g., a DHCPOFFER packet) that includes a network address of PXE server 208 and an identifier for PXE 124. Obtaining module 106 may then cause protected computing device 202 to request that PXE server 208 transfer PXE 124 to protected computing device 202 via a suitable transfer protocol, such as TFTP, HTTP, secure HTTP, and so forth. Obtaining module 106 may then cause protected computing device 202 to receive PXE 124 and to store it within a suitable storage location, such as within a main memory (e.g., random access memory included in memory 140) of protected computing device 202.

In at least one embodiment, obtaining module 104 may obtain PXE 124 from PXE server 208 by determining that protected computing device 202 is included in a list of pre-approved protected computing devices. This may provide an increased level of security for protected computing device 202, data replication device 206, PXE server 208, and/or data associated with any of protected computing device 202, data replication device 206, and/or PXE server 208 (e.g., replica 122). For example, one or more of protected computing device 202, data replication device 206, and/or PXE server 208 may maintain a whitelist 220 that may include a list of identifiers (e.g., MAC addresses, LUNs, etc.) associated with one or more protected computing devices. When a network device (e.g., a DHCP server included as part of data replication device 206 and/or PXE server 208) receives the request that includes the identifier associated with protected computing device 202, obtaining module 104 may determine, based on the identifier associated with protected computing device 202, that protected computing device 202 is included in the list of identifiers included in whitelist 220. In some examples, the network device that receives the request may only respond to the request when obtaining module 104 determines that protected computing device 202 is included in whitelist 220, thereby providing increased security as described above.

Returning to FIG. 3, at step 306, one or more of the systems described herein may direct the protected computing device to boot using the bootable replication environment. For example, directing module 108 may, as part of protected computing device 202, data replication device 206, and/or PXE server 208 in FIG. 2, cause protected computing device 202, data replication device 206, and/or PXE server 208 to direct protected computing device 202 to boot using bootable replication environment 126.

Directing module 108 may direct the protected computing device to boot using the bootable replication environment in a variety of contexts. For example, as mentioned above, bootable replication environment 126 may include a bootable environment that may be utilized to boot a computing device. In some examples, bootable replication environment 126 may include a live operating system that may be booted and/or executed from a memory device associated with protected computing device 202 (e.g., memory 140). Examples of live operating systems that may be included in bootable replication environment 126 may include, without limitation, a LINUX distribution such as CENTOS, UBUNTU, DEBIAN, and REDHAT ENTERPRISE LINUX, a version of MICROSOFT WINDOWS such as WINDOWS PREINSTALLATION ENVIRONMENT, another UNIX-like operating system such as FREEBSD, OPENBSD, APPLE MACOS, and so forth. By way of illustration, bootable replication environment 126 may include a bootable version of CENTOS. Directing module 108 may direct protected computing device 202 to boot using bootable replication environment 126 by directing protected computing device 202 to boot using the bootable version of CENTOS included in bootable replication environment 126.

In some examples, PXE 124 may further include a set of configuration parameters (e.g., configuration parameters 216) associated with data replication device 206. The set of configuration parameters may include, without limitation, an IP address of data replication device 206, an identifier associated with a target storage device associated with replica 122, a group of logical unit numbers ("LUN") common to an application and/or associated with protected computing device 202 (e.g., a "consistency group"), and so forth. In some examples, the configuration parameters may be in a form of parameters for a bootloader (e.g., GNU GRUB) that may be included as boot parameters when protected computing device 202 boots using PXE 124 and/or bootable replication environment 126. Once protected computing device 202 boots using bootable replication environment 126, configuration parameters 216 may be accessible within bootable replication environment 126 at any suitable location (e.g., a file system mount point such as /proc/cmdline).

Figure 4:
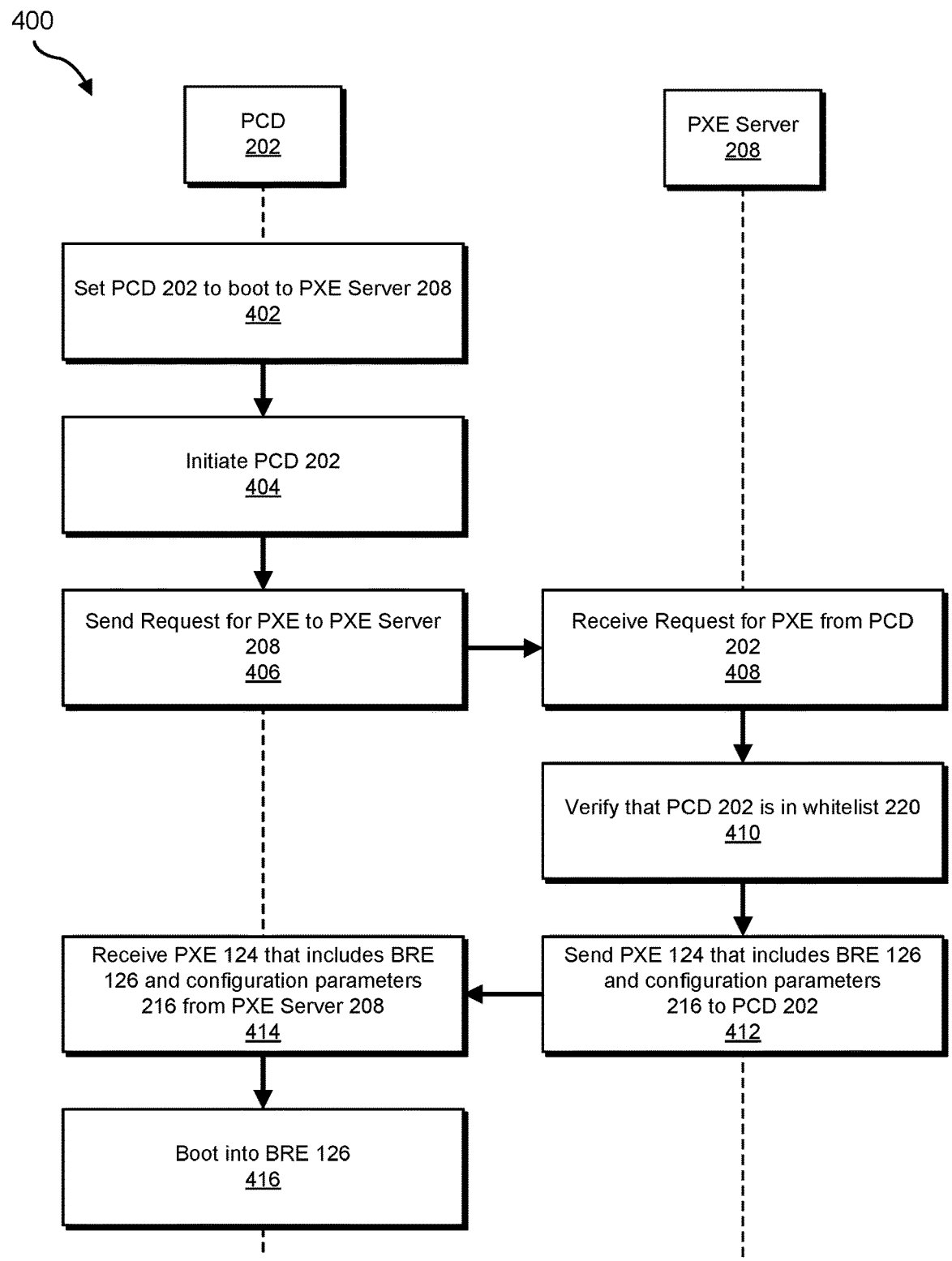
FIG. 4 is a flow diagram of an example operational flow for (1) obtaining, from a PXE server, a PXE that includes a bootable replication environment for a protected computing device and (2) directing the protected computing device to boot using the bootable replication environment.

By way of illustration, FIG. 4 includes a flow diagram of an example operational flow 400 of (1) obtaining, from PXE server 208, a PXE that includes a bootable replication environment for protected computing device 202, and (2) directing protected computing device 202 to boot using the bootable replication environment. As shown in step 402, an administrator, an automated boot management device, one or more of modules 102, etc. may set protected computing device 202 to boot to PXE server 208 (e.g., request a PXE from PXE server 208). In step 404, an administrator, an automated boot management device, one or more of modules 102, etc. may initiate (e.g., turn on) protected computing device 202. In step 406, one or more of modules 102 (e.g., obtaining module 106) may direct protected computing device 202 to send a request for a PXE (e.g., PXE 124) to PXE server 208. In step 408, one or more of modules 102 (e.g., obtaining module 106) may cause PXE server 208 to receive the request for a PXE (e.g., PXE 124) from protected computing device 202. In step 410, one or more of modules 102 (e.g., obtaining module 106) may cause PXE server 208 to verify that protected computing device 202 (e.g., a MAC address associated with protected computing device 202) is in whitelist 220. In step 412, one or more of modules 102 (e.g., obtaining module 106) may cause PXE server 208 to send PXE 124 that includes bootable replication environment 126 and configuration parameters 216 to protected computing device 202. In step 414, one or more of modules 102 (e.g., obtaining module 106) may cause protected computing device 202 to receive PXE 124 that includes bootable replication environment 126 and configuration parameters 216 from PXE server 208. In step 416, one or more of modules 102 (e.g., directing module 108) may cause protected computing device 202 to boot into bootable replication environment 126.

Returning to FIG. 3, at step 308, one or more of the systems described herein may expose at least one data storage device associated with the protected computing device to the data replication device via a secure data connection. For example, exposing module 110 may, as part of protected computing device 202, data replication device 206, and/or PXE server 208 in FIG. 2, cause protected computing device 202, data replication device 206, and/or PXE server 208 to expose data storage device 210 associated with protected computing device 202 to data replication device 206 via secure data connection 212.

As used herein, a "data storage device" such as data storage device 210 may include any suitable data storage device associated with a protected computing device such as protected computing device 202. For example, data storage device 210 may include at least one physical HDD, SSD, or optical disk drive, a virtual storage device (e.g., a virtual machine disk (VMDK), a virtual hard disk (VHD), a VIRTUALBOX disk image (VDI), etc.), variations or combinations of one or more of the same (e.g., one or more logical volumes), and/or any other suitable data storage device.

As used herein, a "secure connection" such as secure connection 212 may include any data connection between at least two computing devices (e.g., protected computing device 202 and data replication device 206) that may be secured using a suitable authentication protocol and/or data encryption scheme. For example, secure data connection 212 may include a data connection secured using SSL, TLS, Internet Protocol Security (IPSec), Challenge-Handshake Authentication Protocol (CHAP) and/or any other suitable authentication protocol and/or data encryption scheme. In some examples, secure data connection 212 may facilitate an Internet Small Computer Systems Interface (iSCSI) connection between protected computing device 202 and data replication device 206 that exposes data storage device 210 at a block level to data replication device 206.

Exposing module 110 may expose at least one data storage device associated with a protected computing device via a secure data connection in a variety of contexts. For example, as described above, in at least one embodiment, PXE 124 may include configuration parameters 216 associated with data replication device 206. In some examples, configuration parameters 216 may include an IP address of data replication device 206, an identifier associated with a target storage device associated with replica 122, a consistency group associated with replica 122 and/or data replication device 206, and so forth. In such embodiments, exposing module 110 may expose data storage device 210 associated with protected computing device 202 to data replication device 206 by validating configuration parameters 216.

Exposing module 110 may validate configuration parameters 216 in any suitable way. For example, when configuration parameters 216 include an IP address associated with data replication device 206, exposing module 110 may cause protected computing device 202 to query the IP address to determine whether data replication device 206 is accessible at the IP address. Additionally or alternatively, when configuration parameters 216 include information associated with a consistency group, exposing module 110 may validate that storage devices included in the consistency group (e.g., volumes, LUNs, protected replication disks, etc.) are available (e.g., accessible via data replication device 206).

In some examples, bootable replication environment 126 may include authentication information 218 associated with data replication device 206. Authentication information 218 may include any suitable information that may enable protected computing device 202 to establish a secure data connection (e.g., secure data connection 212) with data replication device 206. For example, authentication information 218 may include an SSL public key associated with data replication device 206. Hence, in some examples, exposing module 110 may expose data storage device 210 associated with protected computing device 202 to data replication device 206 by establishing secure data connection 212 between protected computing device 202 and data replication device 206 using the authentication information (e.g., the SSL key) associated with data replication device 206. For example, protected computing device 202 and data replication device 206 may execute an SSL handshake process using the authentication information.

As part of, or subsequent to, establishing secure data connection 212, exposing module 110 may cause protected computing device 202 and data replication device 206 to exchange and/or validate replication configuration information, such as disks included in data storage device 210 that may be included in replica 122, sizes of protected replication disks, availability and/or sizes of storage devices included in data storage device 210, and so forth. Some of this replication configuration information may be included as part of configuration parameters 216 included in PXE 124 (e.g., information associated with consistency groups and/or resiliency groups), and may be validated as part of, or subsequent to, establishing secure data connection 212.

Once the replication configuration information has been exchanged and validated, exposing module 110 may expose data storage device 210 to data replication device 206 via an iSCSI protocol. For example, data replication device 206 may operate as an iSCSI initiator and data storage device 210 may operate as an iSCSI target, or vice versa. This may be facilitated by one or more iSCSI frameworks such as the Linux SCSI Target Framework, also known as tgt and/or tgtd. Thus, exposing module 110 may expose (e.g., export, make available to attach, etc.) one or more data storage volumes (e.g., a disk, a group of disks, etc.) included in data storage device 210 to data replication device 206. In some examples, exposing module 110 may expose data storage device 210 to data replication device 206 at a block level (e.g., via an iSCSI protocol). Exposing module 110 may then direct data replication device 206 to connect to (e.g., attach and/or mount) at least one data storage volume included in data storage device 210, creating a logical connection between data replication device 206 and the data storage volume that may be facilitated by secure data connection 212.

Returning to FIG. 3, at step 310, one or more of the systems described herein may replicate the replica of data associated with the protected computing device to the data storage device associated with the protected computing device via the bootable replication environment and the secure data connection. For example, replicating module 112 may, as part of protected computing device 202, data replication device 206, and/or PXE server 208 in FIG. 2, cause protected computing device 202, data replication device 206, and/or PXE server 208 to replicate replica 122 to data storage device 210 via the bootable replication environment 126 and secure data connection 212.

Replicating module 112 may replicate the replica of data associated with the protected computing device to the data storage device associated with the protected computing device via the bootable replication environment and the secure data connection in a variety of contexts. For example, replicating module 112 may direct data replication device 206 to transmit replica 122 to data storage device 210 via secure data connection 212. Additionally or alternatively, replicating module 112 may direct data replication device 206 to execute a resynchronization process whereby data replication device 206 resynchronizes replica 122 (e.g., at a block level) with one or more data storage devices included in data storage device 210 via secure data connection 212. Thus, in these and other ways, the systems and methods described herein may replicate replica 122 to data storage device 210 via secure data connection 212.

In some examples, one or more of the systems described herein may host, via a bootable replication environment, a HTTP server configured to receive REST directives. For example, hosting module 114 may, as part of protected computing device 202, data replication device 206, and/or PXE server 208 in FIG. 2, cause protected computing device 202, data replication device 206, and/or PXE server 208 to host, via bootable replication environment 126, HTTP server 214.

Hosting module 114 may cause protected computing device 202, data replication device 206, and/or PXE server 208 to host, via bootable replication environment 126, HTTP server 214 in a variety of contexts. For example, as described above, bootable replication environment 126 may include a live operating system, such as a modified version of CENTOS, that may be booted and/or executed from a memory device associated with protected computing device 202 (e.g., memory 140). The live bootable operating system may include and/or support software or instructions for providing HTTP server 214. Hosting module 114 may cause protected computing device 202 to execute the instructions, and thereby cause protected computing device 202 to host HTTP server 214.

As an illustration, the live bootable operating system may include a version of HTTP Daemon (also known as httpd) that may run in the background of the live bootable operating system and wait for incoming HTTP requests. Upon receiving a suitable HTTP request, HTTP server 214 may respond by serving data using HTTP and/or by causing protected computing device 202 to execute one or more operations.

Additionally, HTTP server 214 may be configured to receive one or more REST directives. As used herein, a REST directive may include any HTTP request that may be received by HTTP server 214 and may cause HTTP server 214 to execute one or more operations. For example, upon receiving a REST directive that includes a "GET" HTTP method via a particular target uniform resource identifier (URI), HTTP server 214 may respond with one or more data objects associated with the target URL.

In some examples, HTTP server 214 may be secured using one or more encryption techniques including, but not limited to, SSL and/or TLS. In such examples, one or more of modules 102 (e.g., exposing module 110, replicating module 112, hosting module 114, etc.) may cause protected computing device 202 to send public keys associated with HTTP server 214 to data replication device 206 via a secured data connection such as secure data connection 212. In some such examples, HTTP server 214 may be configured to refuse HTTP requests and/or REST directives from clients that cannot establish a secured data connection using the public keys associated with HTTP server 214. In this and other ways, hosting module 114 may configure HTTP server 214 to only accept HTTP requests and/or REST directives from approved devices such as data replication device 206.

In some embodiments, hosting module 114 may receive (e.g., from data replication device 206 at the conclusion of replicating of replica 122 to data storage device 210), via HTTP server 214, a REST directive that includes a secure reboot command. In response to hosting module 114 receiving the secure reboot command, directing module 108 may direct protected computing device 202 to boot into a bootable operating environment of protected computing device 202.

Hosting module 114 may receive a REST directive that includes a secure reboot command in a variety of contexts. For example, HTTP server 214 may expose a REST API endpoint (e.g., a URI) for receiving REST directives that include secure reboot commands. As described above, the endpoint may be secured using one or more encryption techniques, such as SSL and/or TLS. At a conclusion of replicating module 112 replicating replica 122 to data storage device 210, hosting module 114 may cause HTTP server 214 to receive a REST directive (e.g., an HTTP request that includes a suitable HTTP method, such as a "GET" method, a "PUT" method, etc.) at the exposed REST API endpoint from data replication device 206 using public keys associated with HTTP server 214. Directing module 108 may then, in response to hosting module 114 receiving the secure reboot command, direct protected computing device 202 to boot into a bootable operating environment of protected computing device 202, such as a bootable operating environment that may be included in now-replicated replica 122.

Figure 5:
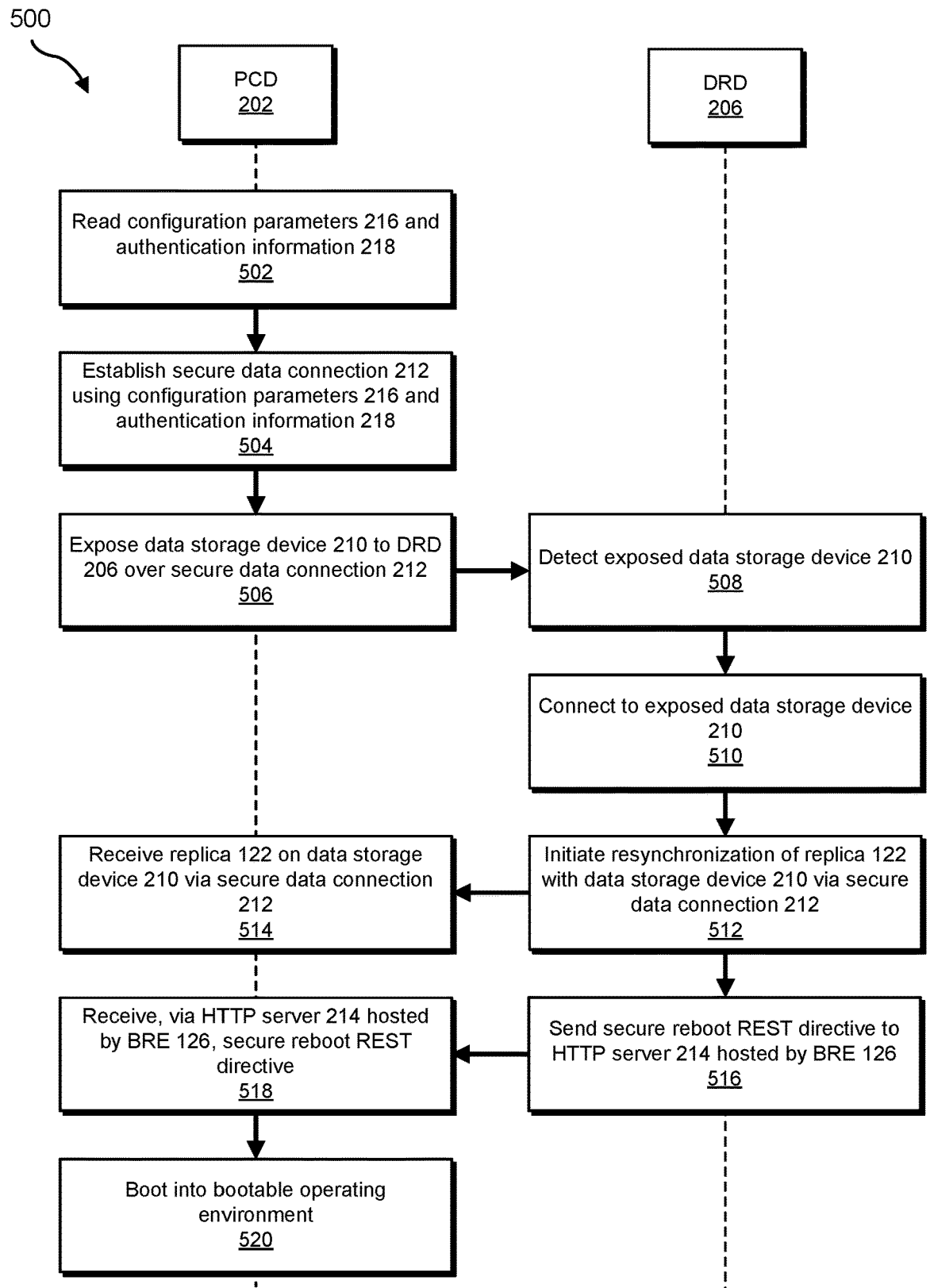
FIG. 5 is a flow diagram of an example operational flow for (1) exposing a data storage device associated with a protected computing device to a data replication device via a secure data connection, and (2) replicating a replica of data associated with the protected computing device to the data storage device via the bootable replication environment and the secure data connection.

By way of illustration, FIG. 5 includes a flow diagram of an example operational flow 500 of (1) exposing data storage device 210 associated with protected computing device 202 to data replication device 206 via secure data connection 212, and (2) replicating replica 122 of data associated with protected computing device 202 to data storage device 210 via bootable replication environment 126 and secure data connection 212. As shown in step 502, one or more of modules 102 (e.g., exposing module 110) may cause protected computing device 202 to read configuration parameters 216 and authentication information 218. In step 504, one or more of modules 102 (e.g., exposing module 110) may cause protected computing device 202 to establish secure data connection 212 using configuration parameters 216 and authentication information 218. In step 506, one or more of modules 102 (e.g., exposing module 110) may cause protected computing device 202 to expose data storage device 210 to data replication device 206 over secure data connection 212. In step 508, one or more of modules 102 (e.g., exposing module 110) may cause data replication device 206 to detect exposed data storage device 210. In step 510, one or more of modules 102 (e.g., exposing module 110) may cause data replication device 206 to connect to exposed data storage device 210 (e.g., attach one or more exposed data storage devices included in data storage device 210 to data replication device 206).

In step 512, one or more of modules 102 (e.g., replicating module 112) may cause data replication device 206 to initiate resynchronization of replica 122 with data storage device 210 via secure data connection 212. In step 514, one or more of modules 102 (e.g., replicating module 112) may cause protected computing device 202 to receive replica 122 on data storage device 210 via secure data connection 212. In step 516, one or more of modules 102 (e.g., replicating module 112, hosting module 114, etc.) may cause data replication device 206 to send a secure reboot REST directive to HTTP server 214 hosted by bootable replication environment 126. In step 518, one or more of modules 102 (e.g., hosting module 114) may cause protected computing device 202 to receive, via HTTP server 214 hosted by bootable replication environment 126, the secure reboot REST directive. In step 520, one or more of modules 102 (e.g., directing module 108, etc.) may cause protected computing device 202 to boot into a bootable operating environment included in replica 122.

In some embodiments, one or more of the systems described herein may maintain state information associated with exposing a data storage device associated with a protected computing device to a data replication device and replicating a replica of data associated with the protected computing device. For example, managing module 116 may, as part of protected computing device 202, data replication device 206, and/or PXE server 208 in FIG. 2, cause protected computing device 202, data replication device 206, and/or PXE server 208 to maintain state 222.

Figure 6:
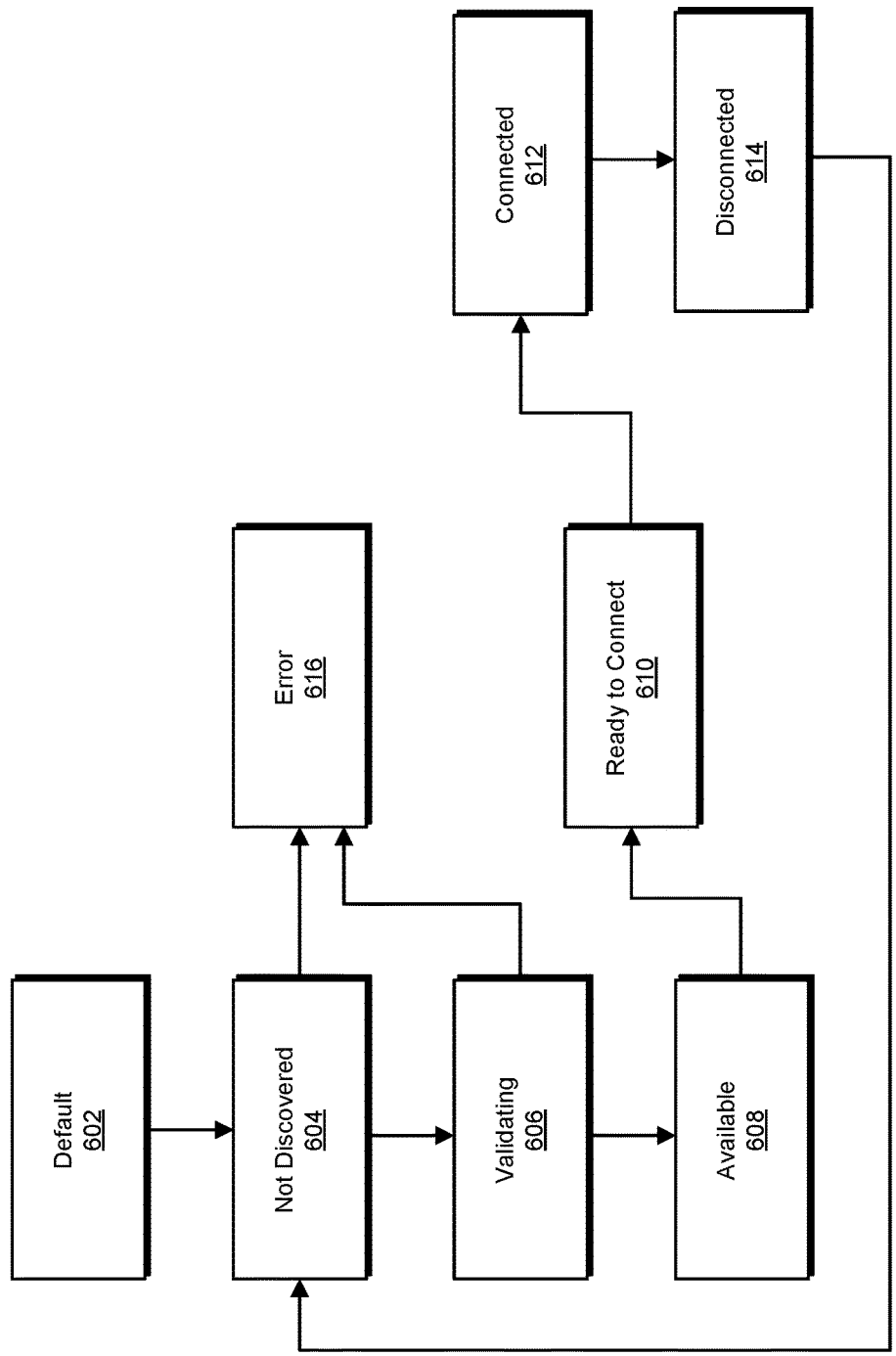
FIG. 6 includes an example state diagram that illustrates various state information that one or more of the systems described herein may maintain in accordance with the systems and methods described herein.

By way of illustration, FIG. 6 includes a state diagram 600 that illustrates various state information that managing module 116 may maintain as state 222. For example, state 602 may represent a default state that managing module 116 may maintain prior to any other operation. State 604 may represent a "Not Discovered" state that managing module 116 may maintain as an initial state. State 606 may represent a "Validating" state that managing module 116 may maintain while one or more of modules 102 (e.g., exposing module 110) validates configuration parameters 216 and/or authentication information 218. State 606 may indicate that bootable replication environment 126 is validating configuration parameters 216 and/or authentication information 218.

State 608 may represent an "Available" state that managing module 116 may maintain once one or more of modules 102 (e.g., exposing module 110) have validated the configuration parameters (e.g., configuration parameters 216 and/or authentication information 218). State 610 may represent a "Ready to Connect" state that managing module 116 may maintain once one or more of modules 102 (e.g., exposing module 110) have successfully exposed data storage device 210 to data replication device 206. In some examples, the "Ready to Connect" state may indicate that exposing module 110 has successfully created iSCSI targets that include one or more storage devices included in data storage device 210.

State 612 may represent a "Connected" state that managing module 116 may maintain once one or more of modules 102 (e.g., exposing module 110) causes data replication device 206 to successfully connect to exposed data storage device 210 via secure data connection 212. In some examples, managing module 116 may maintain state 612 once data replication device 206 connects to iSCSI targets. State 614 may represent a "Disconnected" state that managing module 116 may maintain once one or more of modules 102 (e.g., exposing module 110, replicating module 112, etc.) successfully disconnects data replication device 206 from data storage device 210 and/or protected computing device 202. In some examples, state 614 may indicate that data replication device 206 has successfully disconnected from one or more iSCSI targets.

State 616 may represent an "Error" state that managing module 116 may maintain when it detects that an error has occurred. In some examples, state 616 may indicate that an error occurred while one or more of modules 102 (e.g., exposing module 110) attempted to validate the configuration parameters (e.g., configuration parameters 216 and/or authentication information 218) and/or attempted to create iSCSI targets.

Managing module 116 may maintain state 222 in any suitable way. For example, managing module 116 may maintain state 222 by writing state information to a suitable storage location, such as to a non-volatile storage location associated with protected computing device 202, data replication device 206, and/or PXE server 208 (e.g., data replication device 206, as shown in FIG. 2).

In some embodiments, managing module 116 may cause protected computing device 202, data replication device 206, and/or PXE server 208 to detect an interruption in exposing data storage device 210 to data replication device 206 or replicating replica 122. For example, when protected computing device 202 boots using PXE 124 that includes bootable replication environment 126, managing module 116 may access state 222 and determine, based on state 222, that an interruption occurred during a previous attempt to expose data storage device 210 to data replication device 206 and/or to replicate replica 122 to data storage device 210. For example, managing module 116 may access state 222 and identify that state 222 corresponds to state 612 (a "Connected" state). Managing module 116 may therefore detect that an interruption (e.g., a power failure, a hardware failure, a software failure, etc.) occurred after data replication device 206 successfully connected to exposed data storage device 210 via secure data connection 212, but before managing module 116 began maintaining a "Disconnected" state (e.g., before data replication device 206 successfully disconnected from protected computing device 202). This may indicate that the interruption occurred while replicating module 112 was attempting to replicate replica 122 to data storage device 210.

In at least some embodiments, managing module 116 may direct protected computing device 202, data replication device 206, and/or PXE server 208 to resume exposing data storage device 210 to data replication device 206 or replicating replica 122. Continuing with the previous example, upon detecting the interruption in replicating replica 122 to data storage device 210 (e.g., that an interruption occurred between managing module 116 maintaining state 612 and managing module 116 maintaining state 614), managing module 116 may cause one or more of modules 102 (e.g., replicating module 112) to resume and/or continue replicating replica 122 to data storage device 210. Thus, in the event of an interruption (e.g., a power failure, a hardware failure, a software failure, etc.), the systems and methods described herein may enable replication to continue in the same sequence as before the interruption.

In summary, as described above, embodiments of the systems and methods described herein may obtain a PXE that includes a bootable replication environment for a protected computing device. In some examples, the bootable replication environment may include a stripped down and modified bootable operating system, such as CENTOS, and may also include public SSL keys of a data replication device, like a data mover. In at least one example, the PXE may also include (e.g., as GRUB parameters) some configuration information, such as an IP address of an associated data replication device, associated consistency groups, and so forth. This information may be available to the bootable replication environment after booting (e.g., at a suitable mount point, such as /proc/cmdline).

An embodiment may then direct the protected computing device to boot using the bootable replication environment. The embodiment may then expose at least one data storage device associated with the protected computing device to the data replication device via a secure data connection. For example, the embodiment may validate and/or use the configuration information and the authentication information (e.g., the public SSL keys) to establish a secure data connection between the data replication device and the protected computing device. The embodiment may further expose the data storage device associated with the protected computing device by exposing the data storage device as one or more iSCSI targets (e.g., using an iSCSI framework such as tgtd). The data replication device may then connect to (e.g., attach) data storage device 210, and replicate and/or resynchronize data associated with the protected computing device (e.g., replica 122) to the data storage device.

In some examples, the bootable replication environment may also host an HTTP server that is configured to receive one or more REST directives. Public keys of the HTTP server may be sent to the data replication device over a secured data connection (e.g., secure data connection 212). Once replication and/or resynchronization is complete, the HTTP server may receive a secure reboot command (e.g., from the data replication device), and may reboot using a bootable operating environment (e.g., a bootable operating environment included in replica 122).

In at least some examples, an embodiment may also maintain state information associated with the preceding process, and may utilize the state information to resume the preceding process in the event of an unexpected interruption (e.g., a power failure, a hardware failure, a software failure, etc.).

As discussed throughout the instant disclosure, the disclosed systems and methods may provide one or more advantages over traditional methods of recovery of computing environments. The systems and methods described herein may enable a secure, block-level re-replication or resynchronization of previously replicated data to the protected computing device. This may be accomplished without access to an underlying hypervisor to perform attach and detach operations in a case where the protected computing device is a virtual computing device, and without physical access to perform attach and detach operations in a case where the protected computing device is a physical computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for recovery of computing environments via a replication solution, at least a portion of the method being performed by a computing device comprising at least one processor, the method comprising:
   dynamically maintaining a replica of data associated with a protected computing device via a data replication device;
   obtaining, from a preboot execution environment (PXE) server, a PXE comprising a bootable replication environment for the protected computing device;
   directing the protected computing device to boot using the bootable replication environment;
   exposing at least one data storage device associated with the protected computing device to the data replication device via a secure data connection;
   replicating the replica of data associated with the protected computing device to the data storage device associated with the protected computing device via the bootable replication environment and the secure data connection;
   maintaining state information, the state information associated with replicating the replica of data associated with the protected computing device;
   detecting an interruption in replicating the replica of data associated with the protected computing device; and
   resuming, based on the state information, replicating the replica of data associated with the protected computing device.

2. The computer-implemented method of claim 1, further comprising:
   hosting, via the bootable replication environment, a hypertext transfer protocol (HTTP) server configured to receive representational state transfer (REST) directives;
   receiving, via the HTTP server, a REST directive comprising a secure reboot command; and
   directing, in response to receiving the secure reboot command via the HTTP server, the protected computing device to boot into a bootable operating environment of the protected computing device.

3. The computer-implemented method of claim 1, wherein:
   the PXE further comprises a set of configuration parameters associated with the data replication device; and
   exposing the data storage device associated with the protected computing device to the data replication device comprises validating the set of configuration parameters.

4. The computer-implemented method of claim 1, wherein:
   the bootable replication environment comprises authentication information associated with the data replication device; and
   exposing the data storage device associated with the protected computing device to the data replication device comprises establishing the secure data connection between the protected computing device and the data replication device the using the authentication information associated with the data replication device.

5. The computer-implemented method of claim 4, wherein the authentication information comprises at least one secure socket layer (SSL) public key associated with the data replication device.

6. The computer-implemented method of claim 1, wherein:
   the state information is further
   associated with
   exposing the data storage device associated with the protected computing device to the data replication device;
   detecting an interruption in exposing the data storage device associated with the protected computing device to the data replication device; and
   resuming, based on the state information,
   exposing the data storage device associated with the protected computing device to the data replication device.

7. The computer-implemented method of claim 6, wherein the state information comprises at least one of:
   a default state;
   a not discovered state that corresponds to an initial state;
   a validating state that indicates that the bootable replication environment is validating one or more configuration parameters;
   an available state that indicates that the configuration parameters have been validated;
   a ready to connect state that indicates that the data storage device associated with the protected computing device has been successfully exposed to the data replication device;
   a connected state that indicates that the data replication device has successfully connected to the data storage device via the secured data connection;
   a disconnected state that indicates that the data replication device has successfully disconnected from the protected computing device; and
   an error state that indicates that an error has occurred.

8. The computer-implemented method of claim 1, wherein exposing the data storage device associated with the protected computing device to the data replication device comprises exposing the data storage device associated with the protected computing device to the data replication device via an Internet Small Computer Systems Interface (iSCSI).

9. The computer-implemented method of claim 1, wherein obtaining the PXE from the PXE server comprises determining that the protected computing device is included in a list of pre-approved protected computing devices.

10. The computer-implemented method of claim 1, wherein the protected computing device comprises a physical computing device.

11. The computer-implemented method of claim 1, wherein the protected computing device comprises a virtual computing device.

12. The computer-implemented method of claim 1, wherein the data replication device hosts the PXE server.

13. A system for recovery of computing environments via a replication solution, the system comprising:
 a maintaining module, stored in memory, that dynamically maintains a replica of data associated with a protected computing device via a data replication device;
 an obtaining module, stored in memory, that obtains, from a preboot execution environment (PXE) server, a PXE comprising a bootable replication environment for the protected computing device;
 a directing module, stored in memory, that directs the protected computing device to boot using the bootable replication environment;
 an exposing module, stored in memory, that exposes at least one data storage device associated with the protected computing device to the data replication device via a secure data connection;
 a replicating module, stored in memory, that replicates the replica of data associated with the protected computing device to the data storage device associated with the protected computing device via the bootable replication environment and the secure data connection;
 a managing module, stored in memory, that:
  maintains state information, the state information associated with replicating the replica of data associated with the protected computing device;
  detects an interruption in replicating the replica of data associated with the protected computing device; and
  resumes, based on the state information, replicating the replica of data associated with the protected computing device; and
 at least one physical processor that executes the maintaining module, the obtaining module, the directing module, the exposing module, the replicating module, and the managing module.

14. The system of claim 13, wherein:
 the system further comprises a hosting module, stored in memory, that:
  hosts, via the bootable replication environment, a hypertext transfer protocol (HTTP) server configured to receive representational state transfer (REST) directives; and
  receives, via the HTTP server, a REST directive comprising a secure reboot command;
 the physical processor further executes the hosting module; and
 the directing module further directs, in response to the hosting module receiving the secure reboot command via the HTTP server, the protected computing device to boot into a bootable operating environment of the protected computing device.

15. The system of claim 13, wherein:
 the PXE further comprises a set of configuration parameters associated with the data replication device; and
 the exposing module exposes the data storage device associated with the protected computing device to the data replication device by validating the set of configuration parameters.

16. The system of claim 13, wherein:
 the bootable replication environment comprises authentication information associated with the data replication device; and
 the exposing module exposes the data storage device associated with the protected computing device to the data replication device by establishing the secure data connection between the protected computing device and the data replication device the using the authentication information associated with the data replication device.

17. The system of claim 13, wherein:
 the state information is further associated with exposing the data storage device associated with the protected computing device to the data replication device;
 the managing module further:
 detects an interruption in
 exposing the data storage device associated with the protected computing device to the data replication device; and
  directs, based on the state information,
   the exposing module to resume exposing the data storage device associated with the protected computing device to the data replication device.

18. The system of claim 13, wherein the obtaining module obtains the PXE from the PXE server by determining that the protected computing device is in a list of pre-approved protected computing devices.

19. The system of claim 13, wherein the protected computing device comprises at least one of:
 a physical computing device; and
 a virtual computing device.

20. A non-transitory computer-readable medium comprising one or more computer-executable instructions that, when executed by at least one processor of a computing device, cause the computing device to:
 dynamically maintain a replica of data associated with a protected computing device via a data replication device;
 obtain, from a preboot execution environment (PXE) server, a PXE comprising a bootable replication environment for the protected computing device;
 direct the protected computing device to boot using the bootable replication environment;
 expose at least one data storage device associated with the protected computing device to the data replication device via a secure data connection;
 replicate the replica of data associated with the protected computing device to the data storage device associated with the protected computing device via the bootable replication environment and the secure data connection;
 maintains state information, the state information associated with replicating the replica of data associated with the protected computing device;
 detects an interruption in replicating the replica of data associated with the protected computing device; and
 resumes, based on the state information, replicating the replica of data associated with the protected computing device.

* * * * *